United States Patent
Hovgaard et al.

(10) Patent No.: US 11,293,404 B2
(45) Date of Patent: Apr. 5, 2022

(54) MODEL PREDICTIVE CONTROL IN LOCAL SYSTEMS

(71) Applicant: VESTAS WIND SYSTEMS A/S, Aarhus N (DK)

(72) Inventors: Tobias Gybel Hovgaard, Ry (DK); Jacob Deleuran Grunnet, Tranbjerg J (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 0 days.

(21) Appl. No.: 16/770,869

(22) PCT Filed: Dec. 3, 2018

(86) PCT No.: PCT/DK2018/050318
§ 371 (c)(1),
(2) Date: Jun. 8, 2020

(87) PCT Pub. No.: WO2019/110063
PCT Pub. Date: Jun. 13, 2019

(65) Prior Publication Data
US 2020/0291922 A1     Sep. 17, 2020

(30) Foreign Application Priority Data
Dec. 6, 2017  (DK) .......................... PA 2017 70914

(51) Int. Cl.
*F03D 7/04* (2006.01)
*G05B 13/04* (2006.01)

(52) U.S. Cl.
CPC ............. *F03D 7/045* (2013.01); *F03D 7/048* (2013.01); *G05B 13/048* (2013.01)

(58) Field of Classification Search
CPC ........ F03D 7/045; F03D 7/048; G05B 13/048
See application file for complete search history.

(56) References Cited

U.S. PATENT DOCUMENTS 6,975,925 B1 * 12/2005 Barnes ................... F03D 7/048
                                                          700/286
10,657,447 B1 *  5/2020 McDonnell ............ G06N 3/086
(Continued)

FOREIGN PATENT DOCUMENTS

GB       2405492 A     3/2005
WO    2016150447 A1    9/2016
(Continued)

OTHER PUBLICATIONS

Danish Patent and Trademark Office, 1st technical examination of patent application PA201770914, May 24, 2018.
(Continued)

*Primary Examiner* — Ronald D Hartman, Jr.
(74) *Attorney, Agent, or Firm* — Patterson + Sheridan, LLP

(57) ABSTRACT

A main computing system maintains and optimizes a predictive control model for an energy system, wherein the main computing system receives state information for the energy system, optimizes the predictive control model, and generates control rules for control of the energy system. The one or more local computing systems, each have a local memory for storing control rules for controlling the associated local state. The main computing system receives local state information and updates control rules, wherein the updated control rules comprise a subset of the control rules generated by the main computing system selected to be appropriate to the local state information received at the main computing system.

15 Claims, 9 Drawing Sheets

(56) References Cited

U.S. PATENT DOCUMENTS

| | | | |
|---|---|---|---|
| 2010/0078940 A1 | 4/2010 | Kondo et al. | |
| 2014/0172182 A1* | 6/2014 | Subbotin | H02J 3/382 |
| | | | 700/291 |
| 2015/0184549 A1 | 7/2015 | Pamujula et al. | |
| 2015/0308416 A1* | 10/2015 | Ambekar | F03D 17/00 |
| | | | 700/287 |
| 2015/0362923 A1* | 12/2015 | Westervelt | G05B 15/02 |
| | | | 700/289 |
| 2016/0053745 A1* | 2/2016 | Blom | F03D 7/0224 |
| | | | 416/1 |
| 2016/0084225 A1* | 3/2016 | Guo | F03D 7/045 |
| | | | 700/287 |
| 2016/0201934 A1 | 7/2016 | Hester et al. | |
| 2016/0333855 A1 | 11/2016 | Lund et al. | |
| 2017/0091791 A1 | 3/2017 | Srinivasan et al. | |
| 2017/0315523 A1 | 11/2017 | Cross et al. | |
| 2018/0223814 A1* | 8/2018 | Badrinath Krishna | |
| | | | G06N 3/084 |
| 2018/0276554 A1* | 9/2018 | Kim | F03D 7/045 |
| 2019/0354914 A1* | 11/2019 | Nicholas | G06Q 10/06395 |
| 2020/0056588 A1* | 2/2020 | Nielsen | F03D 7/045 |
| 2020/0210538 A1* | 7/2020 | Wang | G06F 30/20 |
| 2020/0291922 A1* | 9/2020 | Hovgaard | F03D 7/045 |

FOREIGN PATENT DOCUMENTS

| | | | |
|---|---|---|---|
| WO | WO-2016150447 A1 * | 9/2016 | F03D 1/02 |
| WO | 2019110063 A1 | 6/2019 | |

OTHER PUBLICATIONS

PCT Written Opinion of the International Searching Authority, Application: PCT/DK2018/050318 dated May 24, 2018.

Baccino Francesco et al., "An Optimal Model-Based Control Technique to Improve Wind Farm Participation to Frequency Regulation", IEE Transactions on Sustainable Energy, IEEE, USA, vol. 6, No. 3, Jul. 1, 2015 (Jul. 1, 2015), pp. 993-1003.

PCT International Search Report for application PCT/DK2018/050318, dated Feb. 21, 2019 pp. 4.

* cited by examiner

MODEL PREDICTIVE CONTROL IN LOCAL SYSTEMS

TECHNICAL FIELD

The present invention relates generally to model predictive control in local systems. Embodiments are relevant to energy generation installations such as wind turbines and to composite systems comprising multiple energy generation sources.

BACKGROUND

Control of wind turbines for optimisation of power and minimisation of loads can be relatively complex. Wind turbines are often sited in remote locations, and may have local access to limited computing power. Similar issues can arise for other renewable energy generation technologies. These issues are compounded when individual systems are combined together into a grid, particularly if the grid also contains energy storage and energy consuming systems.

Model predictive control (MPC) is a powerful approach to providing control in complex systems, such as wind turbines. A wind turbine MPC controller is provided with a wind turbine model function operating on a number of input variables, and control outputs are derived by optimising this function. Such an optimisation may be difficult to achieve in practice if the wind turbine model function is complex, and if there is limited computing power available to perform the calculation.

Even with a "simple" energy system such as a single wind turbine, such an optimisation can be complex. The optimisation will be even more complex for a more complicated energy system, such as a grid of multiple wind turbines, or comprising energy generation installations of multiple types or even energy storage devices and energy consumers. In such cases, an overall system optimisation will not necessarily result from local optimisation of each separate system.

Effective model predictive control is difficult to achieve in individual systems with limited computing resource. A known approach is explicit model predictive control (Explicit MPC or eMPC), in which a solution to the optimisation problem is computed offline. The offline calculation is reduced to a precomputed result format such as a lookup table, allowing a local system with less computing resource available to obtain a value by lookup and simple function evaluation. However, even an approach of this type is challenging in a wind turbine environment, as given the variation possible in the relevant variables and the granularity needed for effective control, computing resources (in particular, memory) may be inadequate.

It would be desirable to find an approach to model predictive control that would be effective in arrangements requiring control operations to be determined by local systems with limited computational resource.

SUMMARY OF THE INVENTION

In a first aspect, embodiments of the invention provide a method of controlling an energy system by using a main computing system and one or more local computing systems each for controlling an associated local state of the energy system, the method comprising: the main computing system maintaining and optimising a predictive control model for the energy system, wherein the main computing system receives state information for the energy system, optimises the predictive control model, and generates control rules for control of the energy system; the one or more local computing systems, each having a local memory for storing control rules for the associated local state, controlling the associated local state according to the control rules stored in its local memory; wherein the main computing system receives local state information and updates control rules for storage in the or each local computing system, wherein the updated control rules for the or each local computing system comprise a subset of the control rules generated by the main computing system selected to be appropriate to the local state information received at the main computing system.

This approach enables effective model predictive control as local computing systems need only hold a subset of the control rules appropriate to their associated local state, which will typically represent the operating point of an energy system device such as a wind turbine. The local computing systems can then provide model predictive control using an explicit MPC approach unaffected by either computational or storage constraints.

In embodiments, the main computing system updates control rules continually. In other embodiments, the main computing system updates control rules for one of the or each computing systems when the associated local state has changed. This latter approach may reduce both computation and message transfer to some degree.

The energy system may comprise one or more wind turbines, wherein each of the one or more wind turbines is associated with one of the local computing systems. In embodiments, the energy system is an energy grid comprising one or more wind turbines. Wind turbines may not be the only energy system device. In some embodiments, the energy system may comprise one or more wind turbines and one or more other energy sources. Energy system devices need not be limited to energy generating devices. In embodiments, the energy grid may comprise either one or more energy storage elements, one or more energy consumers, or both.

In embodiments, the main computing system is remote from the energy system. This may be a remote configurable system, for example implemented as a cloud computing solution.

In embodiments, main computing system resources are allocated to maintaining and optimising the predictive control model for the energy system according to a predicted time to optimise the predictive control model. This allows computing resources allocated to solution to be scaled according to computational need this is particularly effective when computational resource is provided in a way that can be easily scaled, for example using a cloud based system.

In embodiments, the main computing system modifies and optimises the predictive control model for the energy system in parallel with receiving local state information and continually updating control rules for storage in the or each local computing system. The predictive control model may be paramaterised, in which case modification and optimisation of the predictive control model nay use historical rather than actual values of local state information.

In a second aspect, embodiments of the energy system may comprise one or more local computing systems adapted to interact with a main computing system, the one or more local computing systems each having a local memory for storing control rules for an associated local state of an energy system device, wherein the energy system is adapted for control according to the method of the first aspect as set out above.

In embodiments, the energy system may comprise the main computing system. In other embodiments, the main computing system may be remote from the energy system.

In a third aspect, embodiments of the invention provide a method of controlling an energy system by using a main computing system and one or more local computing systems each for controlling an associated local state of the energy system, the method comprising: the main computing system maintaining and optimising a predictive control model for the energy system, wherein the main computing system receives state information for the energy system, optimises the predictive control model, and generates control information for control of the energy system; wherein main computing system resources are allocated to maintaining and optimising the predictive control model for the energy system according to a predicted time to optimise the predictive control model.

In a fourth aspect, embodiments of the invention provide a method of controlling an energy system by using a main computing system and one or more local computing systems each for controlling an associated local state of the energy system, the method comprising: the main computing system maintaining and optimising a predictive control model for the energy system, wherein the main computing system receives state information for the energy system, optimises the predictive control model, and generates control information for control of the energy system; wherein the main computing system modifies and optimises the predictive control model for the energy system in parallel with receiving state information and generating control rules for storage in the or each local computing system; wherein the predictive control model is paramaterised, and modification and optimisation of the predictive control model uses historical rather than actual values of state information.

In both the third and fourth aspects of the invention, the control information may be control rules as described above. However, in other implementations of these aspects, for example where the communication network and main computing system supports adequate real-time performance, the control information may take other forms. It may, for example, describe a control trajectory.

BRIEF DESCRIPTION OF THE DRAWINGS

One or more embodiments of the invention will now be described, by way of example only, with reference to the accompanying drawings, in which.

DETAILED DESCRIPTION

Embodiments of the invention will be described for use in model predictive control of a park of wind turbines and of more complex energy generation structures involving wind turbines and other components these may include energy storage devices and energy consumers. As will be discussed below, these embodiments are exemplary and not limiting, and other contexts in which embodiments of the invention may be used are also described.

Figure 1:
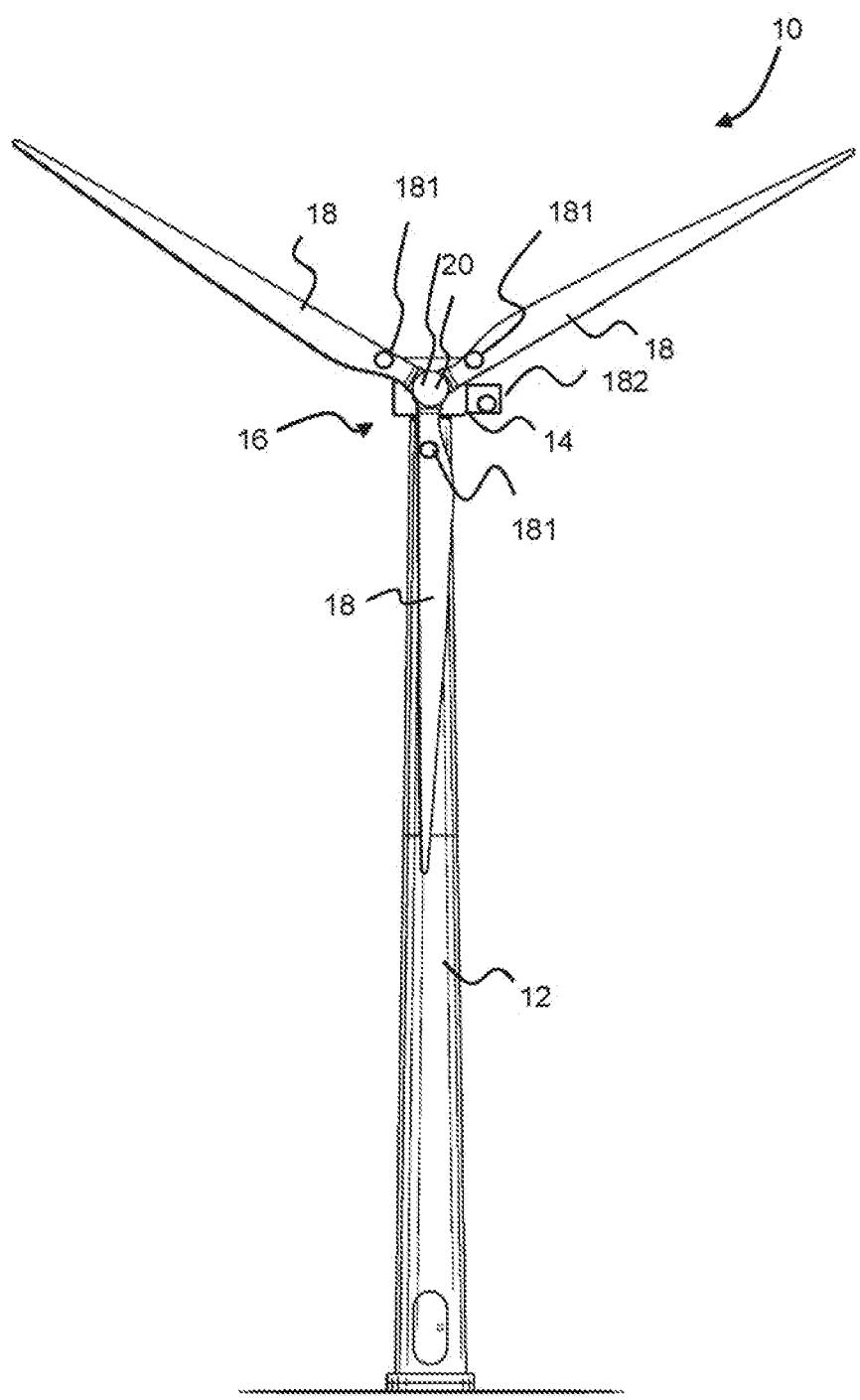
FIG. 1 shows a wind turbine in which embodiments of the invention may be incorporated.

For discussion of the application of model predictive control to wind turbines, controllable elements of a wind turbine will be described. FIG. 1 shows a wind turbine 10 suitable for use with embodiments of the invention. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18 although other configurations are possible. Various sensors may be present to provide information on wind turbine state for use for control purposes. For example (these are not required elements of a model predictive control system and other sensors may be used to detect different state information), in this case each blade 18 comprises a blade load sensor 181 such as a fibre optic strain gauge, and a rotor wind speed detector 182.

Figure 2:
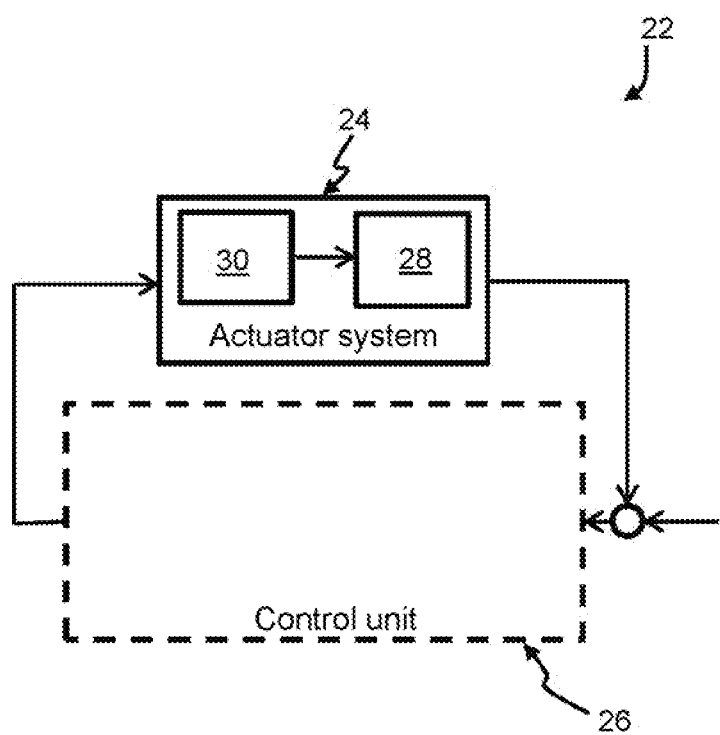
FIG. 2 is a schematic view of a control system in accordance with an embodiment of the invention.

FIG. 2 shows a wind turbine control system 22 which may be implemented in the wind turbine 10 of FIG. 1. Here, the control system 22 includes an actuator system 24 that is controlled by a control unit 26. In this particular embodiment, the actuator system 24 may be or comprise a pitch system for controlling the pitch of one or more of the wind turbine blades 18 which may include a hydraulic actuator 28 arranged to adjust blade pitch in a known manner. The actual position of the actuator 28 is controllable by an actuator position control unit 30 which provides a positioning command signal to the hydraulic actuator 28. This arrangement may be used, for example, to control both collective pitch and cyclic pitch of turbine blades.

It should be noted at this point that the pitch system of the wind turbine 10 is just one example of a wind turbine system that could be controlled and that the control unit 26 could also be used to control other wind turbine systems. For instance, the actuator system 24 may be an electric or hydraulic yaw drive for the nacelle 14 of the wind turbine 10 to provide rotational position control of the nacelle 14 with respect to the tower 12. Another example would be a converter control system where the actuator system 24 may be a power converter of the generation system of the wind turbine 10 that converts AC power delivered by the generator to a variable-frequency AC power output via a DC link in a process known as 'full power conversion'. The skilled person would appreciate that the principle of the invention described herein could be applied to any wind turbine system that requires high speed real time control.

Figure 3:
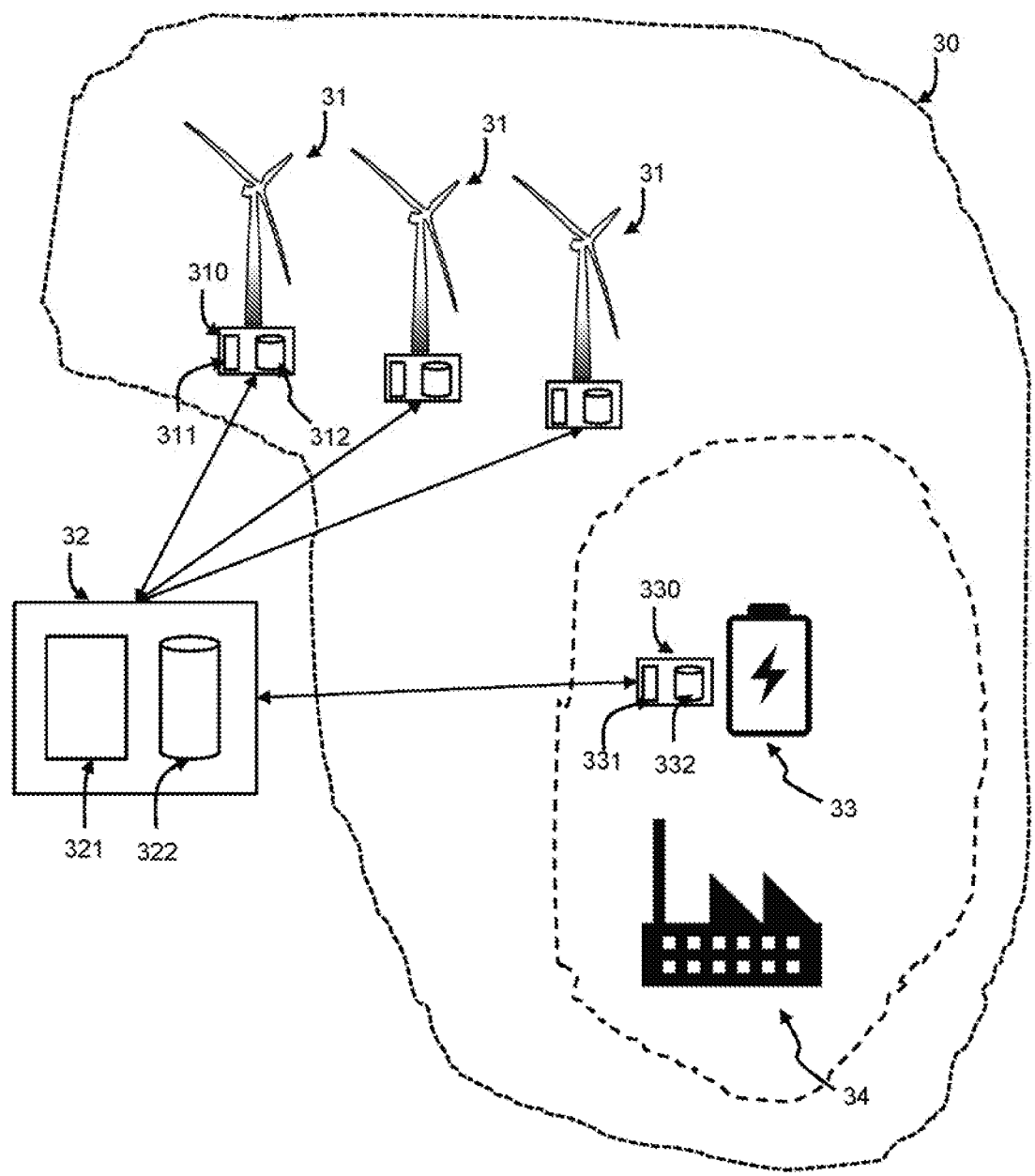
FIG. 3 shows an energy system comprising multiple wind turbines in which an embodiment of the invention is employed.

FIG. 3 shows an energy system comprising multiple wind turbines in which an embodiment of the invention is employed. In this case the energy system comprises a wind park 30 forming a microgrid including a plurality of wind turbines 31, each with its own computing system 310

(comprising a processor 311 and a memory 312). The computing system 310 is adapted here to perform, among other functions, the function of the control unit 26 shown in FIG. 2. As will be described, the computing system 310 of the wind turbine 31 is programmed to control the wind turbine 31 using model predictive control. Conventionally, this would be carried out at the turbine 31 with the predictive control model for that turbine being stored and maintained in memory 312. In the present case, a central computing system 32 in communication with the wind turbine computing systems 310 is also used in the model predictive control process. Here the central computing system 32 (with processor 321 and memory 322) is shown as common for the whole wind park 30 in embodiments, the central computing system 32 may be involved with model predictive control for the wind park 30 only, or may be used for multiple energy systems. As will be discussed below, the control model may be in common (or have shared aspects) for the whole wind park (or across multiple energy systems), or may differ between different turbines. Even if a common predictive control model is used for two different wind turbines, this will still lead to different control results, as state variables at one wind turbine (such as wind speed or blade load) are likely to differ between one wind turbine and another.

FIG. 3 also shows other optional elements of the energy system in this case, an energy storage device 33 and an energy consuming system 34. These may or may not need positive control (in this case, the energy consuming system 34 is shown as not controlled as part of the microgrid, whereas the energy storage device is shown as controlled and provided with its own storage computing device 330 with storage device processor 331 and storage device memory 332. Such further controlled devices may also be controlled directly or indirectly from the model predictive control process.

As previously described, model predictive control (MPC) is a powerful approach to providing control in complex systems, such as wind turbines. The wind turbine MPC controller as conventionally provided by the wind turbine computing system 310 is provided with a wind turbine model function operating on a number of input variables, and control outputs are derived by optimising this function. Even if the optimisation itself can be made convex, this may be computationally challenging if there is limited computing power available in the wind turbine computing system 310, particularly if it would also be desirable to update the model itself. The optimisation will be even more complex for a more complicated energy system, such as a grid of multiple wind turbines, or comprising energy generation installations of multiple types or even energy storage devices and energy consumers. In such cases, an overall system optimisation will not necessarily result from local optimisation of each separate system.

The optimisation of the model predictive control function will provide control outputs for a wind turbine with output values dependent on state variables of the wind turbine. For example, rotor power P may be a control variable of the model with generator speed w a related quantity derived from a model state and with collective and cyclic blade pitch for the wind turbine as outputs another output is may be the power reference to the generator. The objective function implemented by the MPC can address all the requirements placed on the wind turbine together, with tradeoffs between features addressed by appropriate weighting in the performance function.

MPC is based on iterative, finite horizon optimization. At time t the current state is sampled and a cost minimizing control strategy is computed for a time horizon in the future: [t, t+T]. Only the first predicted value for the current sample k is used in the control signal, then the wind turbine state is sampled again and the calculations are repeated starting from the new current state, yielding a new control trajectory and new predicted state trajectory. The prediction horizon keeps being shifted forward and for this reason MPC is a receding horizon controller.

As previously noted, effective model predictive control is difficult to achieve in individual systems with limited computing resource. A known approach to managing this issue is by using explicit model predictive control (Explicit MPC or eMPC), in which a solution to the optimisation problem is computed offline. The offline calculation is reduced to a precomputed result format such as a lookup table, allowing a local system with less computing resource available to obtain a value by lookup and simple function evaluation. However, even an approach of this type is challenging in a wind turbine environment, as given the variation possible in the relevant variables and the granularity needed for effective control, processor speed and memory at the wind turbine computing system may be inadequate.

Figure 4:
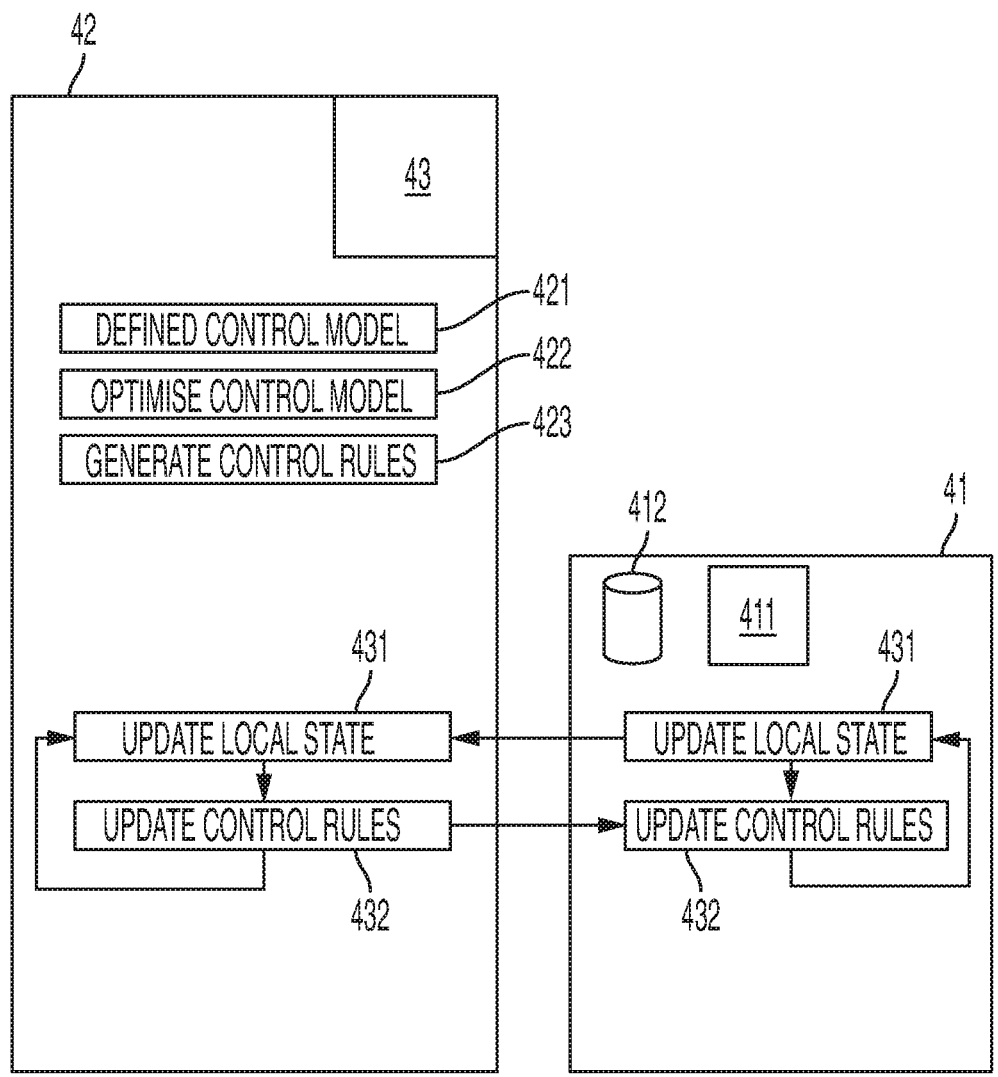
FIG. 4 illustrates an approach to model predictive control according to an embodiment of the invention.

FIG. 4 illustrates how an embodiment of the invention addresses this issue for an energy system, using a central computing system to supplement the individual wind turbine computing systems. This embodiment uses the central computing system as a main computing system 42 to handle computationally complex tasks while using one or more local computing systems 41 (such as the wind turbine computing systems) each for controlling an associated local state of the energy system.

The main computing system 42 maintains and optimises a predictive control model 43 for the energy system. The main computing system 42 receives 421 information defining the energy system including information relating to the or each local state to allow definition of the predictive control model, optimises 422 the predictive control model, and generates 423 control rules for control of the energy system.

Each of the one or more local computing systems 41 has a local memory 412 for storing control rules for the associated local state and has a processor 411 programmed to control the associated local state according to the control rules stored in its local memory 412.

In addition to this, the main computing system 42 continually receives 431 local state information and continually updates 432 control rules for storage in the or each local computing system 41, wherein the updated control rules for the or each local computing system 41 comprise a subset of the control rules generated by the main computing system 42 selected to be appropriate to the local state information received at the main computing system 42.

Implementation of this approach will now be described in more detail. A suitable system for implementation may be for example a microgrid consisting of several small units either producing, consuming or storing energy (or a combination of the three). This will need to be controlled to meet various use criteria, such as fulfilment of grid requirements, management of the combined power output, and/or to minimize loading of the components of the individual units. Such a system could for example be a group of small wind turbines (micro-turbines), possibly with attached photovoltaics as another energy source and/or battery packs for energy storage. Typically, each of these decentralized small units will have very limited computational power for control. This would generally mean that optimisation of a control function would not be practical and MPC would not be feasible to perform on such devices. However, executing simple state-feedback control laws requires little computational power. This allows Explicit MPC to be used the optimisation is carried out offline, with the only calculation required being execution of such a control law. The state-feedback control law is $$u = K_1 x_1 + K_2 x_2 + \ldots + K_n x_n,$$

where $x_n$ is the measured or estimated value of an $n^{th}$ dynamical state of the system, $K_n$ is the state-feedback gain for this $n^{th}$ dynamical state, and u is the vector of signals to be controlled. In Explicit MPC, these state-feedback gains, K, are obtained from a look-up table for based on the conditions at the current point of operation. This look-up table can be generated á priori by formulating an optimization problem for an MPC controller and by solving this optimization problem for large number of initial conditions sampled from the entire space of feasible operating points. If the sampling is extremely fine-grained, the control laws in the look-up table accurately resemble the control action of an online MPC controller.

Performing this calculation and storing the corresponding look-up table offline are practical powerful computing resources and very high volumes of storage are available. This approach is still not practical for use for control at individual system elements with limited computing resources, however. This is not because of processing resources, as the local computing resource only needs to calculate a control law, but because of storage of the look-up table. For a sufficiently fine-grained look-up table, the overall look-up table size would be massive and could easily be larger than what can be accommodated in the memory of limited control hardware. This is particularly the case for wind turbines as environment variations and disturbances such as variation in wind speed and solar radiation—can lead to a very large number of possible scenarios and hence operating points for the system.

In an embodiment of the invention, the approach taken is to solve the computationally demanding optimization problems to fill out a subset of the table with control laws, on a central computational unit such as the main computing system for the energy park, or by using cloud-based computation. The subset of the table is small enough to fit in the memory of the small units and large enough to cover the real-time control of these units around the current operation point until a new table of control laws can be pushed from the central unit.

Figure 5:
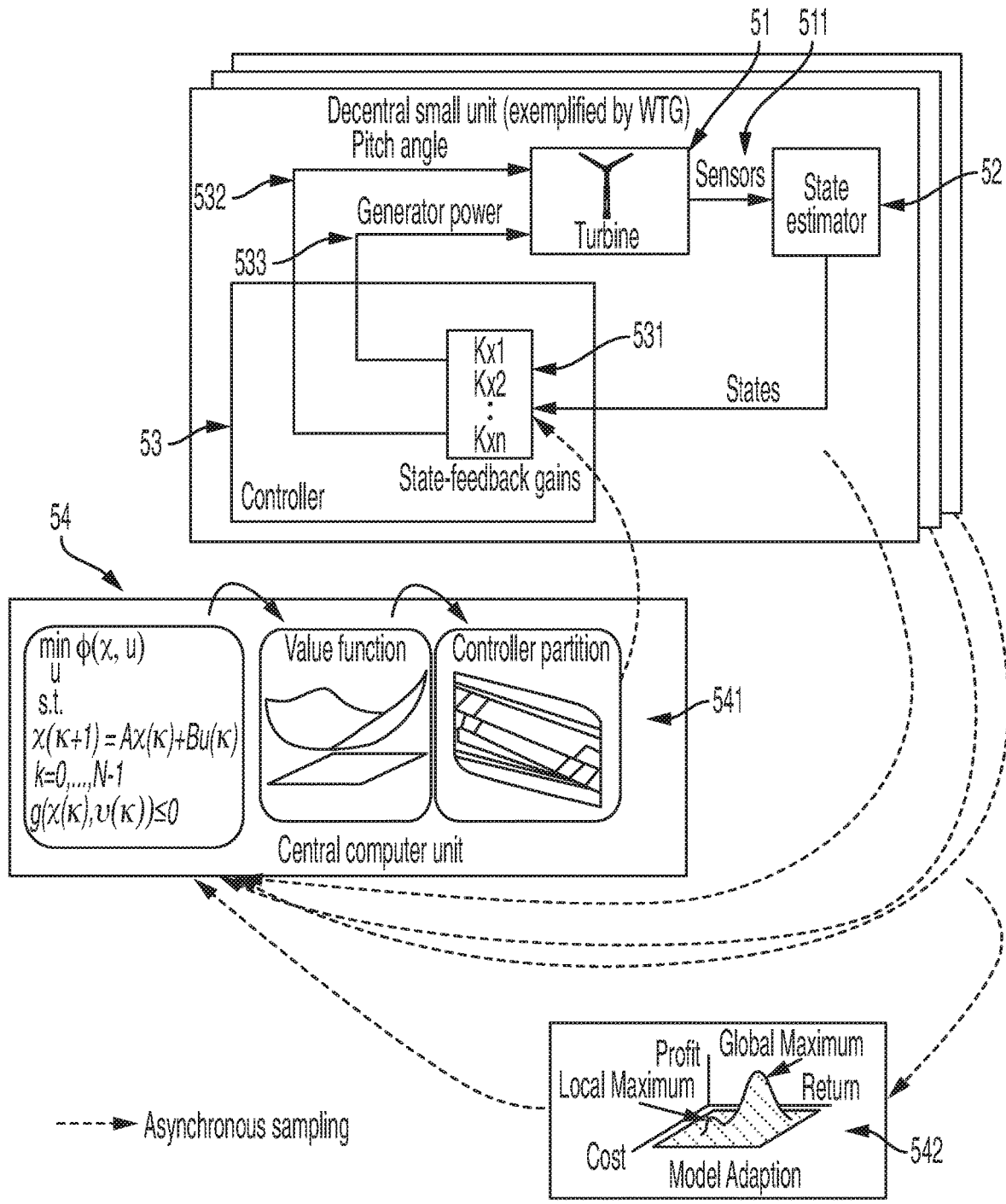
FIG. 5 shows schematically implementation of an embodiment of the invention employing the approach of FIG. 4.

This approach is illustrated in FIG. 5. A wind turbine 51 within a wind park is controlled by a controller 53. State variables of the wind turbine (such as local wind speed) are measured by sensors 511 and a turbine system state is determined by a state estimator 52 (which may be part of a common wind turbine computer system with the controller 53) and sent to a central computing system 54 this may be an asynchronous sampling. This local turbine states, along with other local states of the system, are used to calculate new control laws using the predictive model 541. New control laws are fed back to the turbine controller 53 again, this may be an asynchronous sampling, or may be determined by specific criteria (such as a maximum time having been reached since a previous sampling or by control laws having changed beyond a predetermined threshold)—and used to repopulate the local memory 531 with new control rule values. These are used by the controller to determine control values such as pitch angle 532 and generator power 533 which are used for control of the wind turbine 51.

This topology not only enables MPC control of the small units, it also allows for optimal coordination of the entire park as one large optimization problem, covering all units as well as overall objectives, can be solved when calculating the control laws in the central computer unit. Such a process can result in significant changes in control rules for individual systems where this results, for example, in an individual system needing to transition from the region of one local maxmin point to another. As noted, the central computer unit retrieves state and disturbance information from all units and calculates the new set of control laws asynchronously from the real-time sample frequency in the small units. The update of control laws can be triggered by change of operating points, but also by a number of other criteria, such as local or widespread disturbances.

In a further embodiment, the MPC controller can be model adaptive, i.e., information sampled from the small units can be used in a routine on the central unit to adapt the internal models to reality, e.g. by using hill-climbing algorithms, moving-horizon estimation, or other model estimation techniques. This approach is shown as an option in FIG. 5 (model adaptation 542). This step will typically be computationally demanding, so may not be practical to implement unless it can be performed on a central computing unit.

In another embodiment, this approach can be used for other systems within a wind turbine that have insufficient computational resources to use a full MPC approach for control. The safety system for a turbine may be such a system the safety controller will have some computing resource, but will not be adapted for MPC unless hugely overspecified for its other functions. There is however a huge load saving potential in using MPC control during both normal shutdowns and shutdowns with actuator faults. In an embodiment of the invention, the central computer unit continuously calculates the state-feedback table that would be needed by the safety controller in order to execute an optimal control law for shutting down the turbine from the given current conditions. This approach is obviously not limited to wind turbines, and could be applied to safety systems or other system elements within a microgrid using this approach to MPC control.

Figure 6:
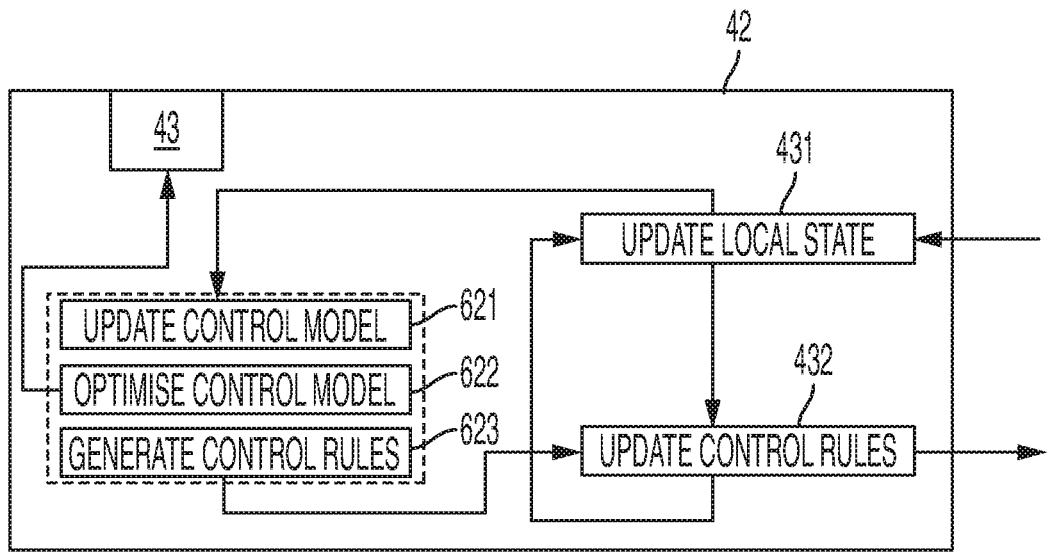
FIG. 6 illustrates a further embodiment of the invention in which the model is updated concurrently with prediction.

Other advantages are possible when the MPC runs in a powerful central computing system, or in a virtualised computing system implemented over the cloud. FIG. 6 shows an embodiment in which this approach is taken to enable model adaptation to take place concurrently with prediction. As noted above typically such an MPC optimisation will be a non-convex problem and require a large amount of computation power, requiring significant computational resource that may not be practical to provide at an individual turbine. However, using this approach the MPC optimization problem can be parameterised, and the MPC model updated by solving the optimisation problem using historical data for the parameters rather than for specific control data.

Modification of the approach of FIG. 4 is shown in FIG. 6. While updated control rules are produced 432 following updated local state 431, in parallel updated local state is used to update the control model 621, which is then optimised 622 and new control rules generated 623 for the whole system, which are then sampled as before for the next control rule update 432 to a local system.

In other embodiments, solution of the optimisation problem can itself be decentralised. In optimization based control methods such as MPC, solving the numerical optimization problem at each sample instance can be computationally expensive, so it is desirable for this to be done remotely from the turbine as described above so that effective MPC can be provided without massively overspecifying the computational resources of the turbine. As a valid control solution must always be available at each sample it is of paramount importance for the computational service to possess sufficient computational power. However, for algorithms like MPC, the level of computational difficulty may very well vary a lot over time and scaling a computational service according to a simple sum of the worst case calculations over all the turbines that utilize the service, will result in sparse utilization of the resources most of the time.

Figure 7:
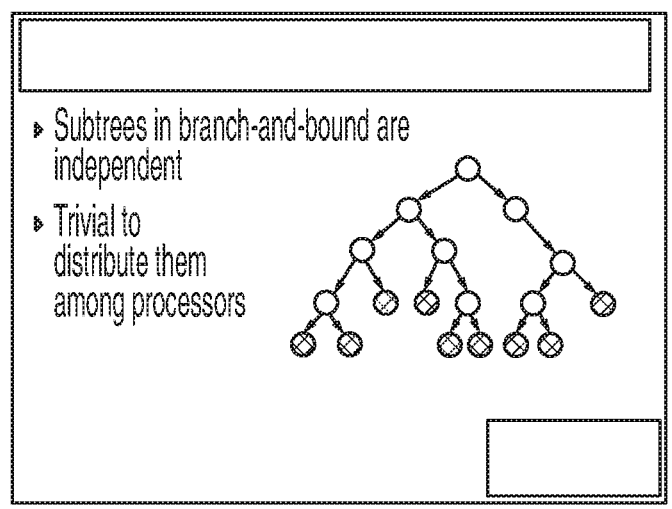
FIG. 7 illustrates computation of a mixed integer problem, such as the computational problem addressed by embodiments of the invention.

Many algorithms can be parallelized to some degree and thus take advantage of distributing the computational load over several nodes or CPU cores. In MPC, several optimization algorithms exist in which a large number of rather easy and almost identical problems are solved before a global solution is computed. Such subproblems can easily be solved in parallel and therefore a high number of CPU cores for a short period of time. Examples of such algorithms are the Alternating Direction Method of Multipliers (ADMM) or other operator splitting techniques where the optimization problem might be split over, e.g., the prediction horizon, random-restart or multiple-shooting algorithms for nonconvex optimization where a global optimum is not necessarily found in one run, and mixed-integer problems. For a mixed-integer problem, optimization often rely on branch-and-bound methods where a search tree of different combinations of values for the integer variables is to be explored (this approach is shown in FIG. 7). Often the number of nodes in the graph for the branch-and-bound search tree explodes with the dimensionality of the problem while the individual nodes are almost identical and in many cases rather simple problems. The subproblems can be solved in parallel at the same time or in large chunks, naturally speeding up the computation speed over a serial solve solution.

Almost all the algorithms mentioned here for optimization in MPC can benefit from warm-starting, i.e., by knowing an approximate solution in advance, the number of subproblems can be drastically reduced. Due to the receding horizon nature of MPC, one problem instance is often very similar to the preceding one and therefore, the solution from the previous sample might be a very good guess to warm-start the following optimization problem. For this reason, there is often a very large difference between average and worst-case computational time and the expenses to computational resources can be reduced by scaling the computational power, i.e. the number of cores, according to the actual load.

Embodiments describe below optimize the computational resources and thus cost of energy by intelligently sharing computational resources across turbines not only by using a centralized computational platform but also by dynamically scaling the resources used by each turbine. This approach for scaling the total resource allocation for all the turbines can be implemented effectively by moving the computations to the cloud, where more resources can be requested during peak computational load periods.

Benefits of this approach can be gained for a single turbine. The computational resources on a single turbine can be optimised using this approach by balancing the needs of the control algorithm with other highly computational intensive algorithms. For the standard decentralized setup it is possible to reduce the number of cores needed in the turbine controller and thus reduce the price. This can be achieved through better utilization of computation cores when other computationally intensive applications are also running on the turbine controller such as condition monitoring (CMS) or operational modal analysis (OMA). In this case the computational effort spent on finding the optimal solution to the control problem can be scaled back when the CMS or OMA algorithms needs higher priority. The computational resources in the turbine can thus be chosen close to the average case computational needs instead of being designed for the worst case situation.

Figure 8A:
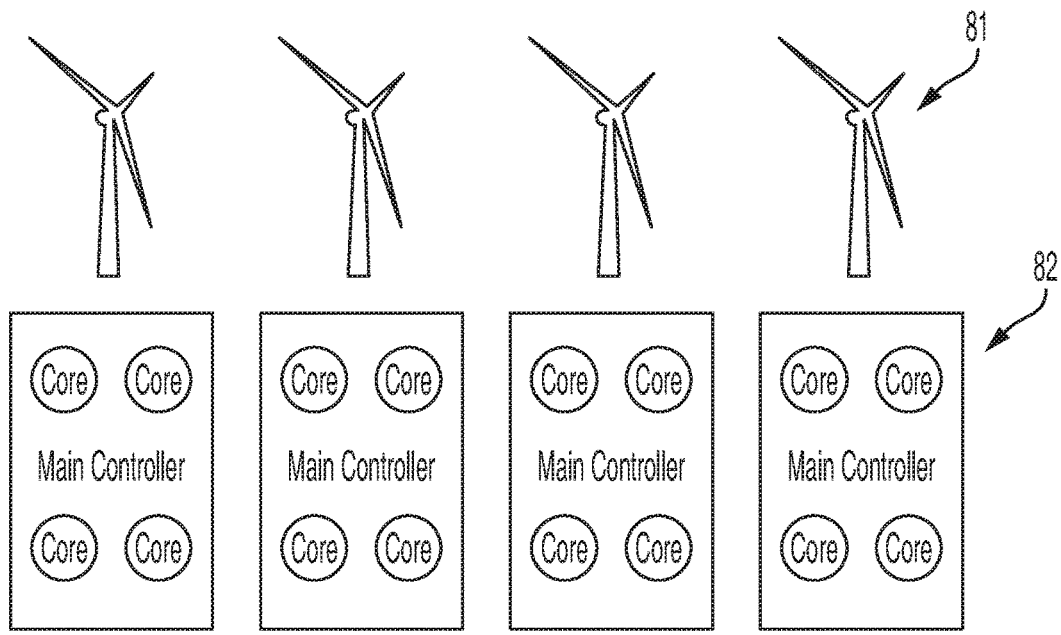
FIGS. 8A and 8B illustrate respectively a conventional wind park setup and a wind park setup according to an embodiment of the invention.
Figure 8B:
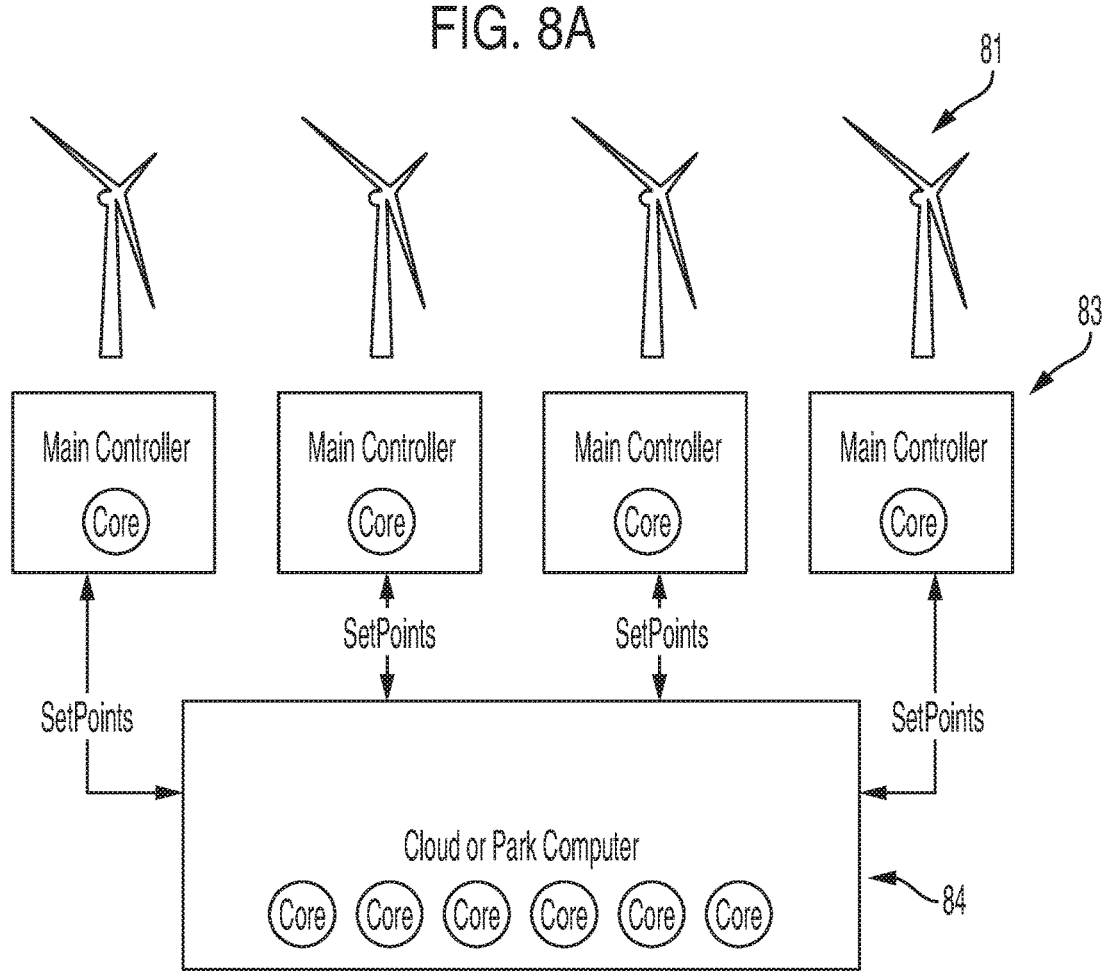

Greater efficiencies are provided by moving from an arrangement as shown in FIG. 8A in which control is provided for each turbine by its controller to a centralized setup as shown in FIG. 8B where the turbine controller is scaled down and a cloud service or park server is used to provide the computational resources for the scalable optimization algorithm. This enables to even further reduce the total number of cores in use as any spikes in computational needs in one location are unlikely to coincide with a spike in all other locations. It is therefore possible to even further reduce the total number of cores available.

A cloud-based, or other datacenter-based, approach has many practical benefits. The cost of providing processing power in a datacenter is much less than for providing it on a turbine, as the environment is much better controlled. In a datacenter, easy upgrades in computational power are available if new, more demanding, algorithms are developed and need to be used, as the computational power can be added at the datacenter, or in the cloud, instead of having to be installed at the turbines.

Figure 9:
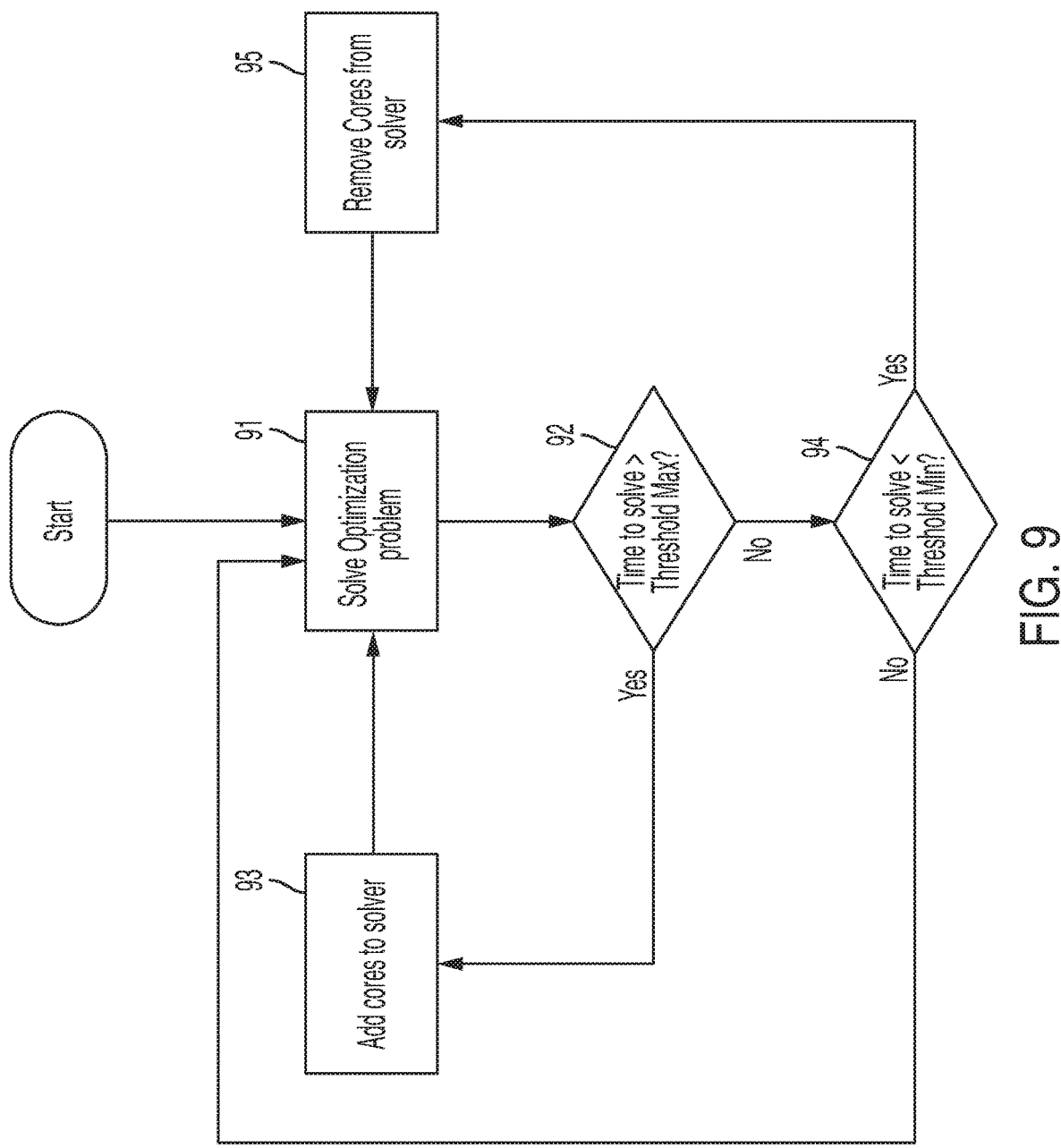
FIG. 9 illustrates an embodiment of a scalable computation process according to an embodiment of the invention.
Figure 10:
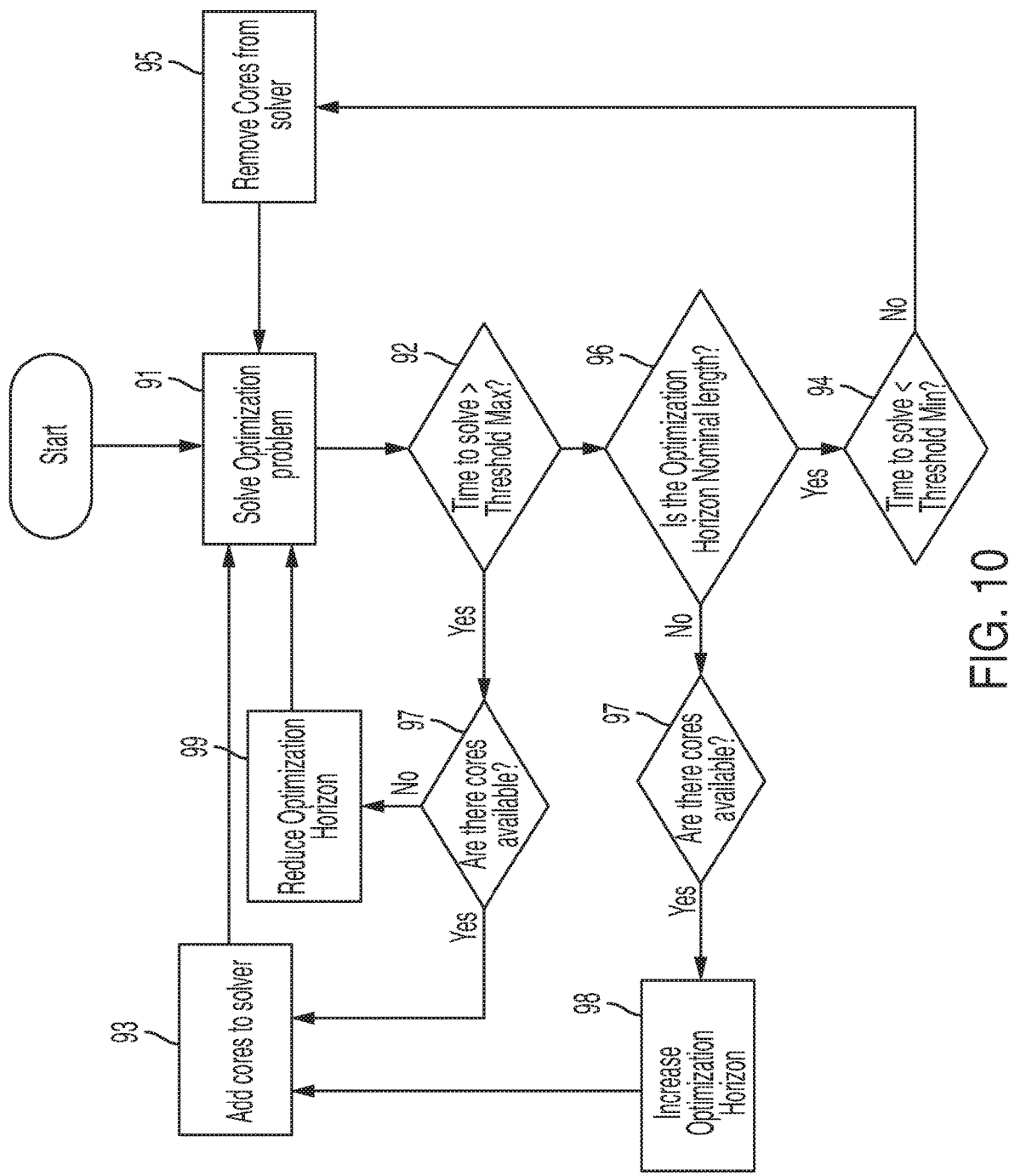
FIG. 10 illustrates a further embodiment of a scalable computation process according to an embodiment of the invention.

Examples of algorithm for core/computational resource scaling for an MPC optimization algorithm are shown in FIGS. 9 and 10. One advantage of MPC algorithms is that if an optimization cannot be performed within the timeslot available it is possible to use the optimal trajectory computed at the last sample time. This enables some very simple core scaling algorithms, as it is not necessary to predict the computational needs, it is only necessary to evaluate whether the time used in the last time step was exceeded.

The basic algorithm shown in FIG. 9 simply evaluates 92, 96 the time taken to solve the problem 91 in the last time step and if it is above a threshold 92 the number of cores assigned to that turbine is increased 93. If it is below a minimum threshold 94 the number of cores is decreased 94.

In the more advanced version shown in FIG. 10, if the time taken to solve the problem is above the threshold 92 and it is determined 97 that there are no more cores available, the prediction horizon (and so the complexity) of the algorithm is decreased 99. This gives a lower accuracy, but this will only be a temporary issue so will typically be acceptable. When cores are available again the horizon can be increased. After future optimisations that take place within the threshold time, a check is made 96 to see whether the horizon has been reduced, and if so, the horizon can be restored 98 if there are found 97 to be cores available.

The invention claimed is:

1. A method of controlling an energy system by using a main computing system and a plurality of local computing systems each for controlling an associated local state of the energy system, the method comprising:

maintaining and optimizing, by the main computing system, a predictive control model for the energy system, wherein the main computing system receives state information for the energy system, optimises the predictive control model, generates control rules for control of the energy system, and stores the control rules in a table stored at the main computing system;

communicating, by the main computing system, (i) a first subset of the table to a first local computing system of the plurality of local computing systems and (ii) a second subset of the table to a second local computing system of the plurality of local computing systems, the first subset being different from the second subset;

controlling, by the first local computing system, a first local state of the energy system using the first subset of the table;

controlling, by the second local computing system, a second local state of the energy system using the second subset of the table; and updating, at the main computing system, at least one of the first subset or the second subset of the table based on local state information received from at least one of the first local computing system or the second local computing system.

2. The method of claim 1, wherein the main computing system updates the control rules continually.

3. The method of claim 1, wherein the main computing system updates at least one of the first subset or the second subset of the table when the at least one the first or second local state has changed.

4. The method of claim 1, wherein the energy system comprises a first wind turbine and a second wind turbine, and wherein the first local computing system controls the first wind turbine and the second local computing system controls the second wind turbine.

5. The method of claim 4, wherein the energy system is an energy grid comprising the first and second wind turbines.

6. The method of claim 5, wherein the energy system further one or more energy sources other than the first and second wind turbines.

7. The method of claim 5, wherein the energy grid comprises at least one energy storage element or energy consumer.

8. The method of claim 1, wherein the main computing system is remote from the energy system.

9. The method of claim 8, wherein the main computing system is a remote configurable system.

10. The method of claim 1, wherein main computing system resources are allocated to maintaining and optimising the predictive control model for the energy system according to a predicted time to optimise the predictive control model.

11. The method of claim 1, wherein the main computing system modifies and optimises the predictive control model for the energy system in parallel with receiving local state information and continually updating the control rules.

12. The method of claim 11, wherein the predictive control model is paramaterised, and modification and optimisation of the predictive control model uses historical rather than actual values of local state information.

13. An energy system comprising a plurality of local computing systems adapted to interact with a main computing system, the plurality of local computing systems each having a local memory for storing control rules for an associated local state of an energy system device, wherein the energy system is configured to perform an operation, comprising:

maintaining and optimizing, by the main computing system, a predictive control model for the energy system, wherein the main computing system receives state information for the energy system, optimizes the predictive control model, generates control rules for control of the energy system, and stores the control rules in a table stored at the main computing system;

communicating, by the main computing system, (i) a first subset of the table to a first local computing system of the plurality of local computing systems and (ii) a second subset of the table to a second local computing system of the plurality of local computing systems, the first subset being different from the second subset;

controlling, by the first local computing system, a first local state of the energy system using the first subset of the table;

controlling, by the second local computing system, a second local state of the energy system using the second subset of the table; and updating, at the main computing system, at least one of the first subset or the second subset of the table based on local state information received from at least one of the first local computing system or the second local computing system.

14. The energy system of claim 13, wherein the energy system comprises the main computing system.

15. The energy system of claim 13, wherein the main computing system is remote from the energy system.

* * * * *